(No Model.)

E. H. NEIMAN.
HEDGE FENCE.

No. 451,066. Patented Apr. 28, 1891.

Witnesses:
Arthur Ashley

Inventor
Eli H. Neiman
by Ross Head
Atty.

UNITED STATES PATENT OFFICE.

ELI H. NEIMAN, OF YORK, PENNSYLVANIA.

HEDGE FENCE.

SPECIFICATION forming part of Letters Patent No. 451,066, dated April 28, 1891.

Application filed July 12, 1890. Serial No. 358,512. (No model.)

*To all whom it may concern:*

Be it known that I, ELI H. NEIMAN, a citizen of the United States, residing at York, in the county of York and State of Pennsylvania, have invented certain new and useful Improvements in Hedge Fences; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention has for its object the training and wiring of a hedge, so as to make a close fence cheap and easy of construction and uniform in appearance. The plants are usually inclined when wired in the same direction and at an angle of about forty-five degrees with the ground, and are maintained in that position by staples straddling a longitudinal wire and embedded in the twigs or are hooked one to another by means of wire loops or links.

In practicing my invention I plant two rows of plants a short distance apart both in the linear direction of the hedge and on a transverse line passing through the same and bend the twigs, when at a proper stage of their growth, in opposite directions, securing them in position by loops formed in a continuous wire, said loops embracing the crossed twigs at the top. The hedge, when completed and trained, has a beautiful pyramidal shape, which gives it an appearance of great solidity, and in reality it is more so than hedges as usually planted, for the reason that when the plants lie all in substantially the same line the shape of the hedge is due entirely to trimming and small stock and fowls can readily pass through it.

Figure 1:
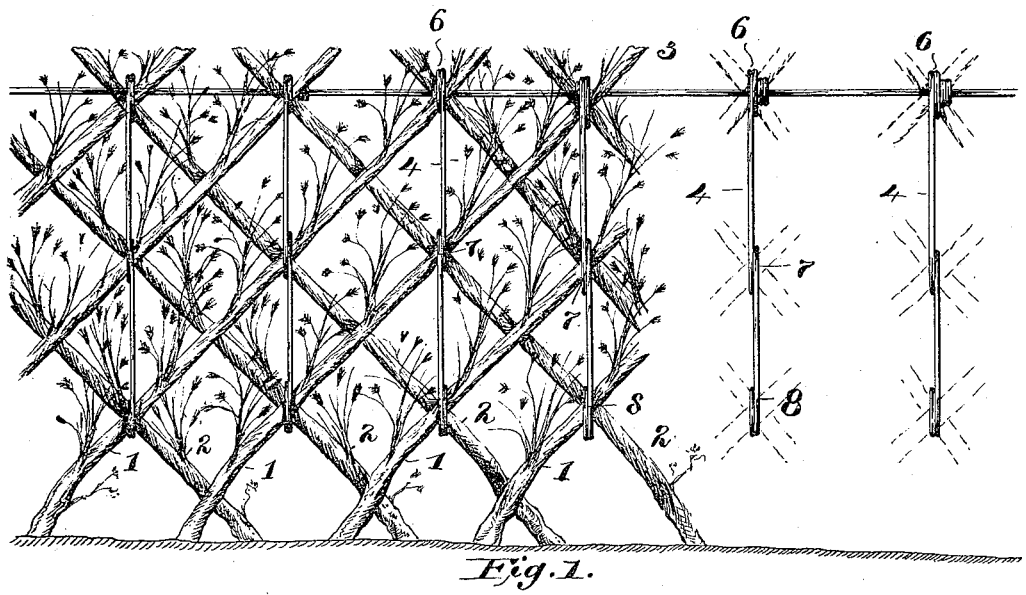
Figure 2:
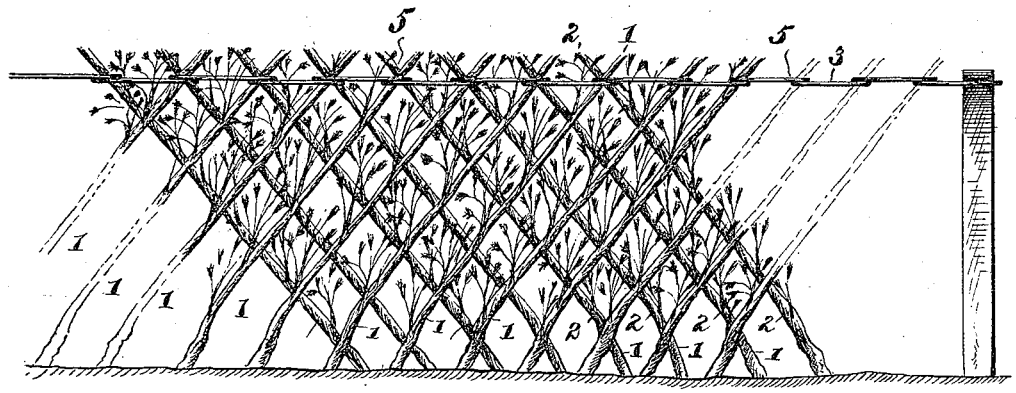

In the accompanying drawings, which illustrate my invention, Figure 1 shows a system of inclining and securing the plants by means of one continuous wire, to which are attached at intervals short wires supporting the twigs at several points of their length. Fig. 2 shows a modification, in which the auxiliary wires are dispensed with.

1 and 2 represent two rows of living plants bent, as shown, in the third or fourth year of their growth so as to cross each other at substantially a right angle. A continuous wire 3 extends the entire length of the hedge and is suitably supported on terminal posts. The operator moves along the hedge with a reel of wire and bends those plants which are separated the proper distance to form the angle at the top when crossed and passes a loop of the wire around them at their point of crossing, which will effectually prevent them from slipping. As shown in Fig. 2, this loop 5 is made from the continuous wire. As shown in Fig. 1, the short pieces of wire 4 are bent around the crossed twigs and around the continuous wire and serve both to bind the plants to the continuous wire, producing a straight and uniform fence and to prevent the individual plants from slipping out of place. If desired, these short wires may be looped around the crossing-points of the twigs at lower points of the fence, as shown at 7 and 8 in Fig. 1, thus bracing the plants and making a stock-proof fence even when the plants are quite young.

Having thus described my invention, what I claim as new, and desire to secure by Letters Patent, is—

In a hedge fence, the combination of a row of living plants bent in opposite directions and crossing one another, a continuous wire extending the length of the fence, and short auxiliary wires attached to the continuous wire and looped around the twigs at two or more crossing-points above and below.

In testimony whereof I affix my signature in presence of two witnesses.

ELI H. NEIMAN.

Witnesses:
CHARLES BIEVENOUR,
R. R. KAYLER.